United States Patent
Chen et al.

(10) Patent No.: US 12,124,843 B2
(45) Date of Patent: Oct. 22, 2024

(54) METHOD AND SYSTEM FOR NON-MONOLITHIC CONTACTLESS ACCEPTANCE ON MOBILE DEVICES

(71) Applicant: Visa International Service Association, San Francisco, CA (US)

(72) Inventors: Yuexi Chen, San Francisco, CA (US); Jennifer Astrein, San Francisco, CA (US); Alexandre Pierre, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 111 days.

(21) Appl. No.: 17/798,817

(22) PCT Filed: Feb. 10, 2021

(86) PCT No.: PCT/US2021/017389
§ 371 (c)(1),
(2) Date: Aug. 10, 2022

(87) PCT Pub. No.: WO2021/163139
PCT Pub. Date: Aug. 19, 2021

(65) Prior Publication Data
US 2023/0089172 A1     Mar. 23, 2023

Related U.S. Application Data

(60) Provisional application No. 62/972,492, filed on Feb. 10, 2020.

(51) Int. Cl.
*G06F 8/70* (2018.01)
*G06F 9/445* (2018.01)

(52) U.S. Cl.
CPC ............ *G06F 8/70* (2013.01); *G06F 9/44536* (2013.01)

(58) Field of Classification Search
CPC .......... G06F 8/36; G06F 8/61; G06F 8/70–72; G06F 9/445; G06F 9/44536; G06F 9/54; G06F 17/00; G06F 21/00
See application file for complete search history.

(56) References Cited

U.S. PATENT DOCUMENTS 7,127,706 B2   10/2006   Mason
8,713,647 B2   4/2014   Waidner
(Continued)

OTHER PUBLICATIONS

Jung-Hua Lo, "Software reliability estimation for modular software systems and its applications," ITRE 2005. 3rd International Conference on Information Technology: Research and Education, 2005., Hsinchu, Taiwan, 2005, pp. 312-316 (Year: 2005).*

(Continued)

*Primary Examiner* — Hanh Thi-Minh Bui
(74) *Attorney, Agent, or Firm* — Kilpatrick Townsend & Stockton LLP

(57) ABSTRACT

A method conducted using a mobile device is disclosed. The method includes maintaining a plurality of software modules, wherein each software module of the plurality of software modules is built and executed independently of other software modules. The mobile device receives first interaction initiation data corresponding to a first transaction. In response to receiving the first interaction initiation data, a first subset of the plurality of software modules is selected via an application interface to execute the first transaction. The mobile device receives second interaction initiation data corresponding to a second transaction. In response to receiving the second interaction initiation data, a second subset of the plurality of software modules to execute the second transaction is selected via the application interface. The first subset of the plurality of software modules is different than the second subset of the plurality of software modules.

17 Claims, 6 Drawing Sheets

(56) References Cited

U.S. PATENT DOCUMENTS

| | | | |
|---|---|---|---|
| 10,713,017 B2* | 7/2020 | Miyake | G06F 8/36 |
| 2009/0228868 A1 | 9/2009 | Drukman et al. | |
| 2011/0191790 A1 | 8/2011 | Ba | |
| 2013/0198732 A1* | 8/2013 | Fujita | G06F 8/65 |
| | | | 717/170 |
| 2013/0268437 A1 | 10/2013 | Desai et al. | |
| 2015/0302534 A1 | 10/2015 | Langman et al. | |

OTHER PUBLICATIONS

"JoinPAY, A Modular Fintech Platform", By MST, Multisystem Technologies, Available online at https://join-pay.com/images/documents/joinpay_presentation_web_eng.pdf, 18 pages.

Gnatyk, "Microservices Vs Monolith: Which Architecture Is the Best Choice for Your Business?", Document retrieved from: https://www.n-ix.com/microservices-vs-monolith-which-architecture-best-choice-your-business/#:~:text=While%20a%20monolithic%20application%20is,as%20perform%20the%20specific%20functions, Oct. 3, 2018, 6 pages.

Application No. PCT/US2021/017389, International Search Report and Written Opinion, Mailed On May 27, 2021, 9 pages.

Application No. EP21754213.3, Extended European Search Report, Mailed On Feb. 28, 2024, 6 pages.

Gamma et al., "Design Patterns: Elements of Reusable Object-oriented Software", Addison-Wesley Professional Computing Series, Jan. 1, 1995, pp. 273-282.

\* cited by examiner

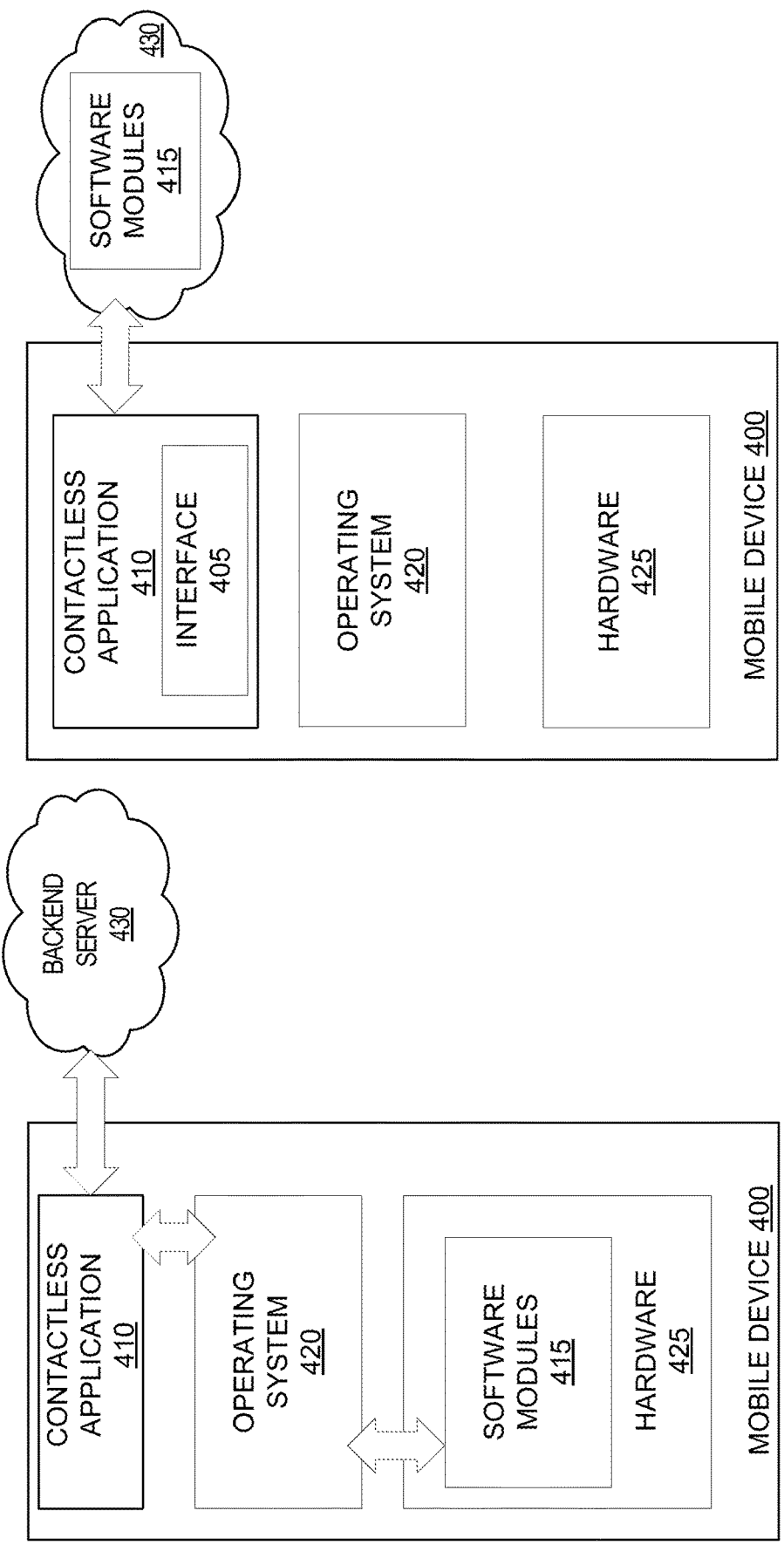

METHOD AND SYSTEM FOR NON-MONOLITHIC CONTACTLESS ACCEPTANCE ON MOBILE DEVICES

CROSS-REFERENCE TO RELATED APPLICATIONS

This application claims the benefit of the filing date of U.S. Provisional Application No. 62/972,492, filed on Feb. 10, 2020, which is incorporated herein by reference in its entirety for all purposes.

BACKGROUND

In a traditional access device architecture (e.g., a traditional transit terminal or POS terminal), all software modules including, for example, an entry point module, a contactless kernels module, etc., are developed and compiled together by a single software developer. Moreover, the software modules are compiled as a software package and tied to a specific platform. Such an architecture is typically referred to as a monolithic architecture. The monolithic architecture does not provide flexibility in terms of updating the software modules deployed therein. Specifically, in order to add a new software module, typically requires a complete reconfiguration of the entire software package.

An alternative access device architecture packs a minimum number of software modules (e.g., single entry point and single kernel) of each software developer into a component e.g., a software development kit. An application installed on a device e.g., a tap-to-access application is further configured to integrate multiple components to process a transaction. However, memory consumption and processing requirements of such an architecture are high. Moreover, the architecture also incurs additional limitations. For example, the acceptance device needs explicit input from the user as to which type of card the user is utilizing to conduct a transaction. Upon receiving such information, the access device can activate a corresponding SDK component to process the transaction. Due to user intervention required to process the transaction, such an access device tends to degrade user experience.

Embodiments of the disclosure address these and other problems, individually and collectively.

BRIEF SUMMARY

By one embodiment, there is provided a method conducted using a mobile device. The method includes maintaining a plurality of software modules, each software module of the plurality of software modules being built and executed independently of other software modules. The mobile device receives first interaction initiation data corresponding to a first transaction. In response to receiving the first interaction initiation data, a first subset of the plurality of software modules is selected via application interface, to execute the first transaction. The mobile device receives second interaction initiation data corresponding to a second transaction. In response to receiving the second interaction initiation data, a second subset of the plurality of software modules is selected via the application interface to execute the second transaction, wherein the first subset of the plurality of software modules is different than the second subset of the plurality of software modules.

Another embodiment provides for mobile device comprising a processor and a non-transitory computer readable medium coupled to the processor. The non-transitory computer readable medium comprises code, which when executed by the processor, implements a method comprising: maintaining a plurality of software modules embedded in an application installed on the mobile device, each software module of the plurality of software modules being built and executed on a distinct software package. The mobile device receives a first trigger signal from a first user device, wherein the first trigger signal indicates that a first transaction is to be performed by the mobile device. In response to receiving the first trigger signal, a first subset of the plurality of software modules is selected via application interface to execute the first transaction. The mobile device receives a second trigger signal from a second user device, wherein the second trigger signal indicates that a second transaction is to be performed by the mobile device. In response to receiving the second trigger signal, a second subset of the plurality of software modules is selected via the application interface to execute the second transaction.

These and other embodiments are described in further detail below, with reference to the figures and detailed description.

BRIEF DESCRIPTION OF THE DRAWINGS

FIGS. 4A-4D illustrate exemplary deployment schemes of the plurality of software modules according to embodiments of the present disclosure.

DETAILED DESCRIPTION

Figure 1:
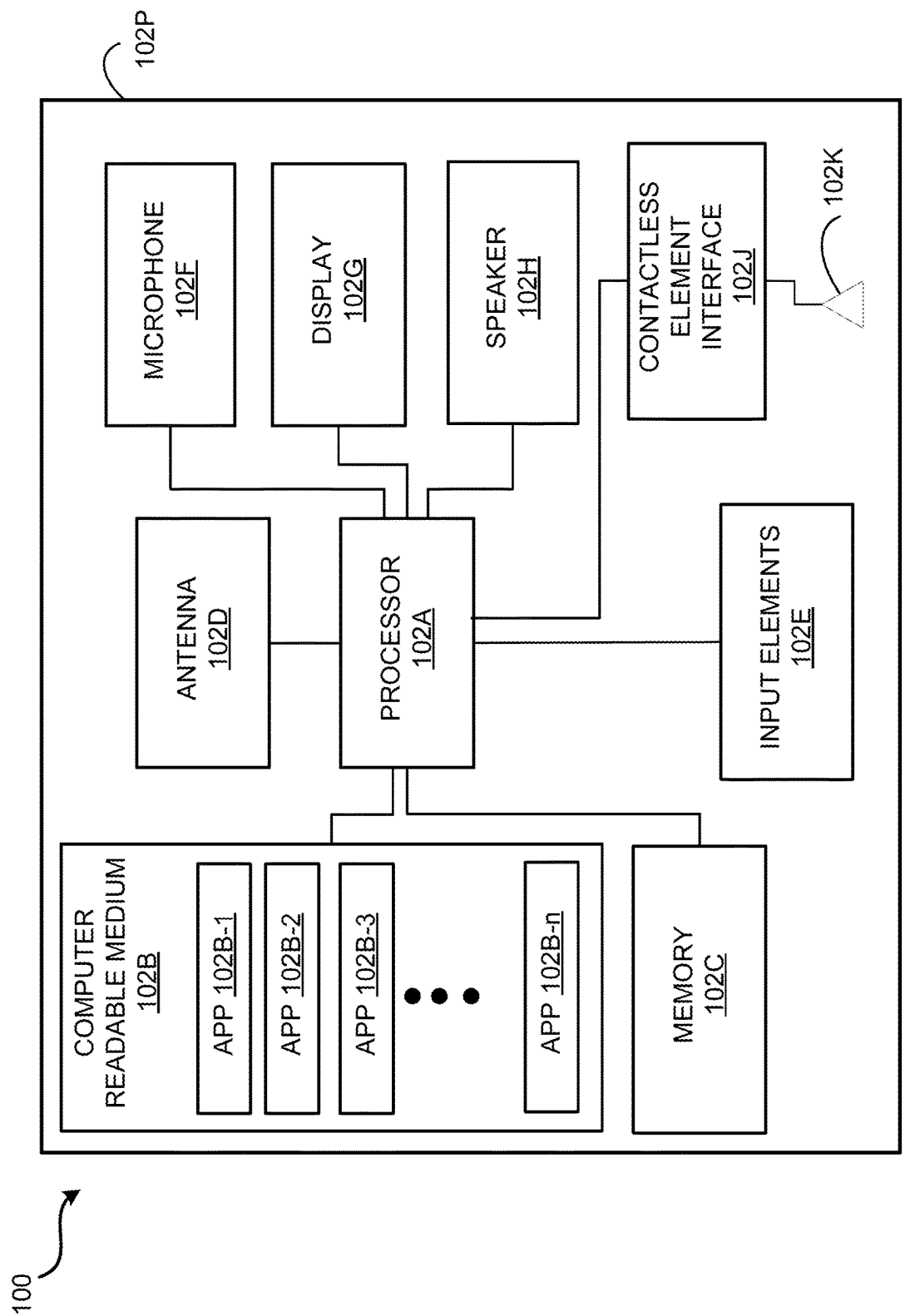
FIG. 1 shows a block diagram of a mobile device according to an embodiment.

Some embodiments of the present disclosure provide for a non-monolithic architecture for a mobile device that is configured to be an access device. The non-monolithic architecture includes a plurality of software modules, wherein each software module of the plurality of software modules is built and executed independently of other software modules. Moreover, each software module is executed on a distinct software package. As will be described below, the non-monolithic architecture provides for a seamless manner for conducting contactless transactions.

Before discussing the detailed embodiments of the invention, some descriptions of certain terms may be useful.

A "user" may include an individual. In some embodiments, a user may be associated with one or more personal accounts and/or portable devices. The user may also be referred to as a cardholder, account holder, or consumer in some embodiments.

A "user device" may be any suitable device that can be used by a user (e.g., a payment card or a mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth low-energy (BLE), Wi-Fi, iBeacon, etc.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a payment transaction in which devices can interact to facilitate a payment.

"Interaction data" can include data related to an interaction. In some embodiments, interaction data can be transaction data. Transaction data can comprise a plurality of data elements with data values associated with a transaction. In some embodiments, interaction data can include identifiers, credentials, amounts, dates, times, etc.

An "interaction input message" may be a communication received during an interaction. For example, a message sent by an access device or resource provider device may be an interaction input message for a receiving portable device. One example of an interaction input message can include an APDU (application protocol data unit) command.

An "interaction output message" may be a communication sent during an interaction that is responsive to an interaction input message. One example of an interaction output message can include an APDU response sent by a mobile device, in response to receiving an APDU command.

A "module" can include a set of standardized parts or independent units that can be used to construct a more complex structure. In some embodiments, a module can include any of a number of distinct but interrelated units from which a program may be built up or into which a complex activity may be analyzed.

A "kernel" can include a core of an operating system. In some embodiments, a kernel can include interface routines, security and control functions, and logic to manage a set of commands and responses to retrieve the necessary data from, for example, a mobile device to complete an interaction. In some embodiments, kernel processing can cover the interaction with the portable device between the selection of the portable device application (excluded) and processing of the outcome of the interaction (excluded).

A "resource provider" may be an entity that can provide a resource such as goods, services, information, and/or access to a location (e.g., a parking space, a transit terminal, etc.). Examples of resource providers include merchants, governmental authorities, secure data providers, etc. A resource provider may operate one or more resource provider computers.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorization computer" or "authorizing entity computer" may include any system involved in authorization of a transaction. The authorization computer may determine whether a transaction can be authorized and may generate an authorization response message including an authorization status (also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource. In some cases, the authorization computer may be a content provider server computer associated with a content providing entity, which manages one or more resources that may be accessed by a user. The authorization computer may be known as an authorizing entity computer. The authorization computer may include an "access control server" that may be configured to authenticate a user.

An "authorization request message" may be an electronic message that requests authorization for a transaction. In some embodiments, it is sent to a payment processing network and/or an issuer of a payment account to request authorization for a payment transaction. An authorization request message according to some embodiments may comply with ISO 8583, which is a standard for systems that exchange electronic transaction information associated with a payment made by a consumer using a payment device or a payment account. An authorization request message may also comprise additional data elements corresponding to "identification information" including, for example, a service code, a CVV (card verification value), a dCVV (dynamic card verification value), an expiration date, etc. An authorization request message may also comprise "transaction data," such as any information associated with a current transaction (e.g., the transaction amount, merchant identifier, merchant location, etc.), as well as any other information that may be utilized in determining whether to identify and/or authorize a payment transaction.

An "authorization response message" may be reply to an authorization request message. In some embodiments, an authorization response message may be an electronic message reply to an authorization request message generated by an issuing financial institution (i.e. issuer) or a payment processing network. An authorization response message according to some embodiments may comply with ISO 8583, which is a standard for systems that exchange electronic transaction information associated with a payment made by a consumer using a payment device or a payment account. The authorization response message may include an authorization code, which may be a code that an account issuing bank returns in response to an authorization request message in an electronic message (either directly or through the payment processing network) to a merchant's access device (e.g., point of sale terminal) that indicates approval of the transaction. The code may serve as proof of authorization. As noted above, in some embodiments, a payment processing network may generate and/or forward the authorization response message to the merchant.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "token" may be a substitute value for a credential. A token may be a string of numbers, letters, or any other suitable characters. Examples of tokens include access tokens such as payment tokens, data that can be used to access secure systems or locations, etc.

A "server computer" or a "backend server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a block diagram 100 of a mobile device according to an embodiment. The mobile device 100 may also include a processor 102A (e.g., a microprocessor) for processing the functions of the mobile device 100 and a display 102G to allow a user to view information. The mobile device 100 may further include input elements 102E (e.g., a touchscreen, keyboard, touchpad, sensors such as biometric sensors, etc.), a speaker 102H, and a microphone 102F, each of which is operatively coupled to the processor 102A. A contactless element interface 102J, an antenna 102D, a memory 102C, and a computer readable medium 102B may also be operatively coupled to the processor 102A.

The computer readable medium 102B and the memory 102C may be present within a body 102P. The body 102P may be in the form a plastic substrate, housing, or other structure. In some cases, the memory 102C may be a secure element, and/or may also store information such as access data, including tokens, PANs, tickets, etc. Information in the memory 102C may be transmitted by the mobile device 100 to another device using an antenna 102D or contactless element interface 102J. The mobile device 100 may use antenna 102D for wireless data transfer (e.g., using wireless networking protocols such as IEEE (Institute of Electronics Engineers) 802.11) or mobile phone communication (e.g., 3G, 4G, and/or LTE). Antenna 102K of contactless element interface 102J may be configured for sending and receiving wireless signals at a frequency specified by different wireless protocols such as NFC (Near Field Communication), BLE (Bluetooth Low Energy), RFID (Radio Frequency Identifier), or any other suitable form of short or medium range communications mechanism.

In some embodiments, the contactless element interface 102J is implemented in the form of a semiconductor chip (or other data storage element) with an associated wireless transfer (e.g., data transmission) element, such as an antenna. Data or control instructions that are transmitted via a cellular network may be applied to the contactless element interface 102J. Contactless element interface 102J may be capable of transferring and receiving data using a short range wireless communication capability. Thus, the mobile device 100 may be capable of communicating and transferring data or control instructions via both a cellular network (or any other suitable wireless network—e.g., the Internet or other data network) or any short range communications mechanism.

The computer readable medium 102B may contain one or more service provider applications 102B-1-102B-n. The service provider applications 102B-1-102B-n can, in conjunction with the processor 102A, allow the mobile device 102 to communicate with various service provider computers. Each application can provide functions provided by its respective service provider. Examples of service provider applications can include digital wallet applications, payment applications (e.g., mobile banking application designed and maintained by a bank or payment processing network), merchant applications (e.g., enabling a user's participation in a loyalty rewards program), transit applications (e.g., storing credit from a prepaid card), ticketing applications (e.g., may store pre-purchased tickets for access to an event or location), applications to access secure data, etc.

One of the applications installed on the mobile device may be a contactless application e.g., a tap-to-pay application. The computer readable medium 102B may comprise code, executable by the processor 102A, for implementing methods according to embodiments. For example, the computer readable medium 102B may comprise code, executable by the processor 102A for implementing a contactless transaction e.g., a tap to pay transaction, which is executed by the contactless application. According to some embodiments of the present disclosure, the mobile device 100 may operate as a point-of-sale terminal, wherein the contactless application installed on the mobile device is configured to accept and process a payment transaction from a user. For instance, the user may utilize a user device e.g., a credit card, a debit card etc., and perform a tap operation of the user device with respect to the mobile device 100. Upon detecting an interaction of the user device, the contactless application may receive an interaction initiation data from the user device. Thereafter, the contactless application may execute a payment process to complete the transaction. Details pertaining to an exemplary contactless transaction are described later in detail. Furthermore, the mobile device of FIG. 1 may be a mobile phone such as an Android phone, IOS phone, etc.

Figure 2B:
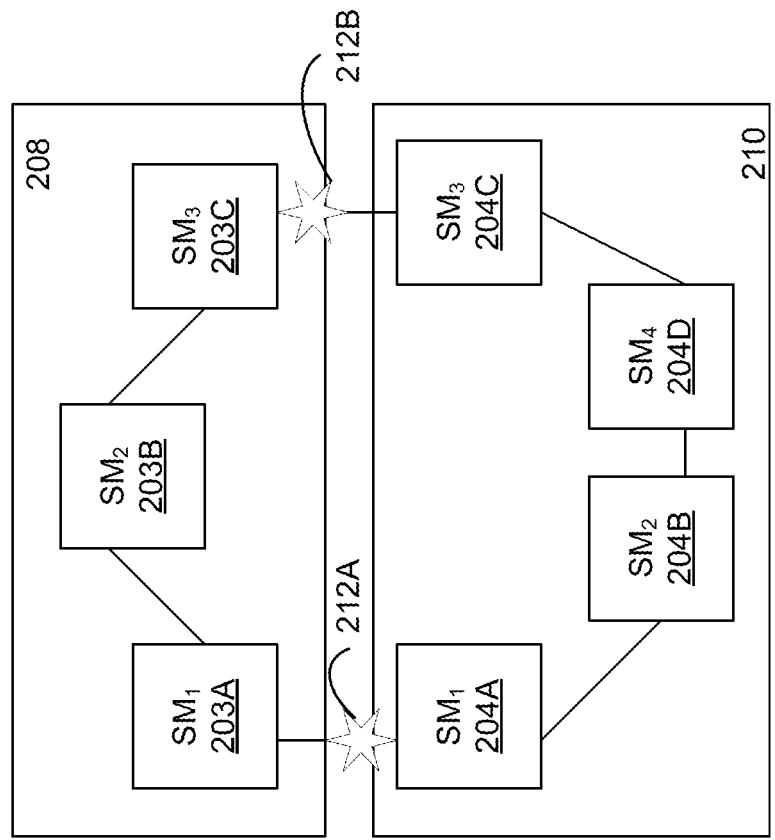
FIGS. 2A and 2B depict architectures of a plurality of software modules according to an embodiment.
Figure 2A:
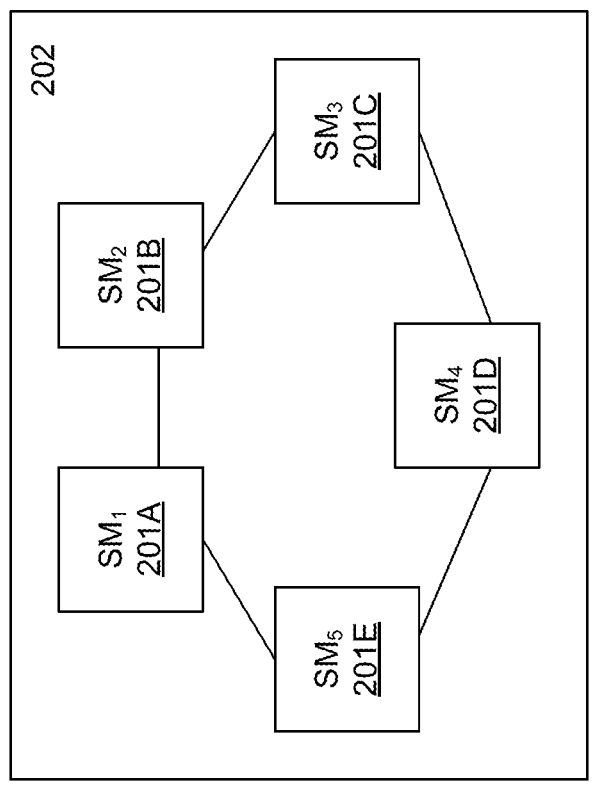

FIGS. 2A and 2B depict architectures of a plurality of software modules, which are configured to execute a contactless transaction according to an embodiment. As depicted in FIG. 2A, a plurality of software modules (SM) are deployed on a single software package 202. Specifically, the architecture of FIG. 2A comprises the plurality of software modules i.e., $SM_1$ 201A, $SM_2$ 201B, $SM_3$ 201C, $SM_4$ 201D and $SM_5$ 201E deployed on a software package 202. The software package (also referred to herein as a binary package) may correspond to an executable file which is utilized to execute the plurality of software modules.

The architecture illustrated in FIG. 2A is referred to as a monolithic architecture. In such an architecture, each of the plurality of software modules is built by a single software developer and the plurality of software modules is compiled (i.e., as a whole) on a single software package i.e., an executable file, on a specific hardware platform. The execution sequence of the software modules is determined by a programming logic. Specifically, the sequence in which the software modules are executed is determined at built time i.e., time at which the modules are developed. As such, in the monolithic architecture, the software modules incur a link dependency i.e., execution of a specific software module occurs only upon the completion of execution of its successor software module, wherein the sequence of software module execution is determined at built time.

End users utilizing the monolithic architecture e.g., for processing contactless transactions are tied to a single software developer, as all the software modules are built and compiled by the single software developer. Additionally, the monolithic architecture does not provide flexibility in updating the software modules deployed on the platform. For instance, consider the scenario wherein the monolithic architecture includes a certain number of deployed software modules. In such a scenario, if the end user desires to add a new software module e.g., a value added service module, then an entire reconfiguration operation of all the software modules is to be performed by the software developer.

To address the above stated deficiencies of the monolithic architecture, FIG. 2B provides for another software architecture of deploying the plurality of software modules. The architecture depicted in FIG. 2B comprises a first plurality of software modules that are built and compiled by a first software developer, and a second plurality of software modules that are built and compiled by a second software developer being deployed on a mobile device e.g., in an application installed on the mobile device. As shown in FIG. 2B, the first plurality of software modules includes the software modules $SM_1$ 203A, $SM_2$ 203B, and $SM_3$ 203C which are compiled on the software package 208 developed by the first software developer. The second plurality of software modules includes the software modules $SM_1$ 204A, $SM_2$ 204B, $SM_3$ 204C, and $SM_4$ 204D that are compiled on the software package 210 developed by the second software developer.

The architecture of FIG. 2B provides for a collection of a plurality of software modules (each plurality of software modules being developed by a distinct software developer), which enables end users to conduct transactions using different methods e.g., by using credit cards or debit cards associated with different payment authorizers. However, a drawback of such an architecture is that the memory consumption is high due to multiple software modules of different software developers being deployed simultaneously on the mobile device. Further, when a user taps a payment card, the architecture of FIG. 2B poses a conflict situation as described below.

By some embodiments, the plurality of software modules include an entry point software module, a contactless kernel module, a pin-capture module, a device attestation module, a gateway connection module and the like. Typically, to commence processing of a transaction, an entry module is activated. Referring to FIG. 2B, the software module $SM_1$ 203A may correspond to the entry module associated with the first software developer's plurality of software modules, and the software module $SM_1$ 204A may correspond to the entry module associated with the second software developer's plurality of software modules. Thus, when a user performs a tap operation i.e., tapping of a payment card, a conflict situation may occur—the software architecture of FIG. 2B may not be able to determine (without user intervention) as to which entry module i.e., entry module $SM_1$ 203A or entry module $SM_1$ 204A is to be activated. The conflict situation between the two entry modules is depicted as 212A. It must be appreciated that a similar type of conflict situation depicted as 212B may occur between other software modules of the two software developers. Thus, a seamless operation of the software architecture of FIG. 2B, requires explicit user intervention e.g., an indication from the user as to which type of card is being used for the transaction, which leads to degraded user experience.

Figure 3:
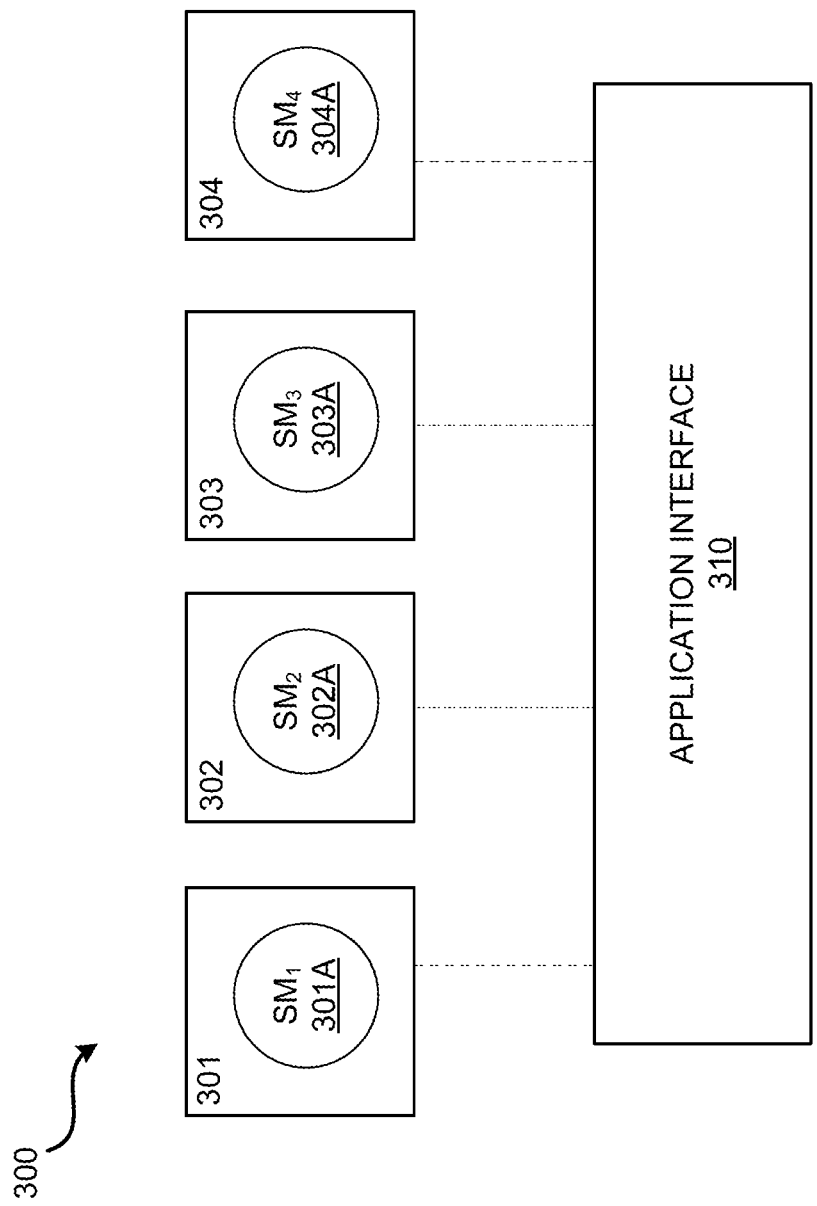
FIG. 3 depicts an exemplary architecture of a plurality of software modules according to an embodiment.

Turning now to FIG. 3, there is depicted an exemplary architecture of a plurality of software modules according to an embodiment of the present disclosure. The architecture 300 as depicted in FIG. 3 addresses the deficiencies of the software architectures of FIGS. 2A and 2B described above. Specifically, the architecture 300 includes a plurality of software modules $SM_1$ 301A, $SM_2$ 302A, $SM_3$ 303A and $SM_4$ 304A, wherein each software module is built independently of one another and also executed on a distinct software package i.e., an executable file. For example, $SM_1$ is executed on a first software package (i.e., a first executable file) 301, $SM_2$ is executed on a second software package 302 (i.e., a second executable file), $SM_3$ is executed on a third software package 303 (i.e., a third executable file), and $SM_4$ is executed on a fourth software package 304 (i.e., a fourth executable file), wherein the first, second, third, and fourth software packages may be different from one another.

Further, the architecture 300 includes an application interface 310. In contrast to the architectures of FIGS. 2A and 2B, wherein the software modules transfer data to one another in order to process a transaction, the architecture 300 utilizes the application interface 310 to process the transaction. Specifically, by some embodiments, the mobile device may detect the presence of a first user device in its proximity (i.e., within a predetermined distance), when a user performs a tap operation using the first user device. In other words, the mobile device receives a first trigger signal when the first user device is tapped to the mobile device. In response to detecting the first user device, the mobile device receives a first interaction initiation data (e.g., an identifier of the interaction) corresponding to a first transaction. The application interface 310 selects a first software module from the set of software modules i.e., 301 to 304. Upon the selected first software module completing its processing, a first output is transmitted by the first software module to the application interface 310. The application interface 310, in turn, transmits the obtained first output (from the first software module) to a second software module for continuing the processing of the transaction. In this manner, the architecture 300 utilizes the application interface 310 to complete processing of the transaction via a set of software modules.

In a similar manner, upon receiving second interaction data (corresponding to a second transaction), the application interface 310 may select a second set of software modules to process the transaction. The second interaction data may be received when the mobile device detects the presence of a second user device within a predetermined distance i.e., the mobile device receives a second trigger signal when a user taps the second user device to the mobile device. It should be noted that first set of software modules utilized to process the first transaction may be different than the set second of software modules used to process the second transaction. By some embodiments, a number of software modules selected to process a transaction may be determined at least in part on an interaction initiation data e.g., an identifier associated with the transaction that is received by the application interface 310. Moreover, it must be appreciated that each of the first user device and the second user device may correspond to a credit card, a debit card and the like. Additionally, the first user device may correspond to a credit/debit card associated with a first payment processing network e.g., the first device is a VISA card, whereas the second user device may be associated with a second payment processing network e.g., the second device is a MasterCard device.

The architecture 300 provides for each software module to be programmed independently i.e., use of any programming language, code obfuscation technique, encryption/decryption algorithm etc. As such, each software module can be compiled and tested independently, which implies that in the architecture 300, there is no link dependency between the software modules i.e., the software modules as depicted in FIG. 3 are not code-link dependent. Additionally, in contrast to the architectures depicted in FIGS. 2A and 2B, the software module's architecture as depicted in FIG. 3 can be updated in a seamless manner. Specifically, as each software module is built independently of one another, a new software module (from different a different software developer) can be easily added/removed/updated from the pool of software modules without requiring a complete reconfiguration of the other software modules in the system. For example, a third party software developer (e.g., an acquirer) may develop a new software module to be added to the existing plurality of software modules. The newly added software module may be built (and compiled) based on algorithms proprietary to the third party e.g., the new software module may be built based on encryption algorithms to encrypt data from two different payment authorizers. Such a newly built software module may be added to the existing plurality of software modules without requiring the other modules in the plurality of software modules to be reconfigured.

Figure 4B:
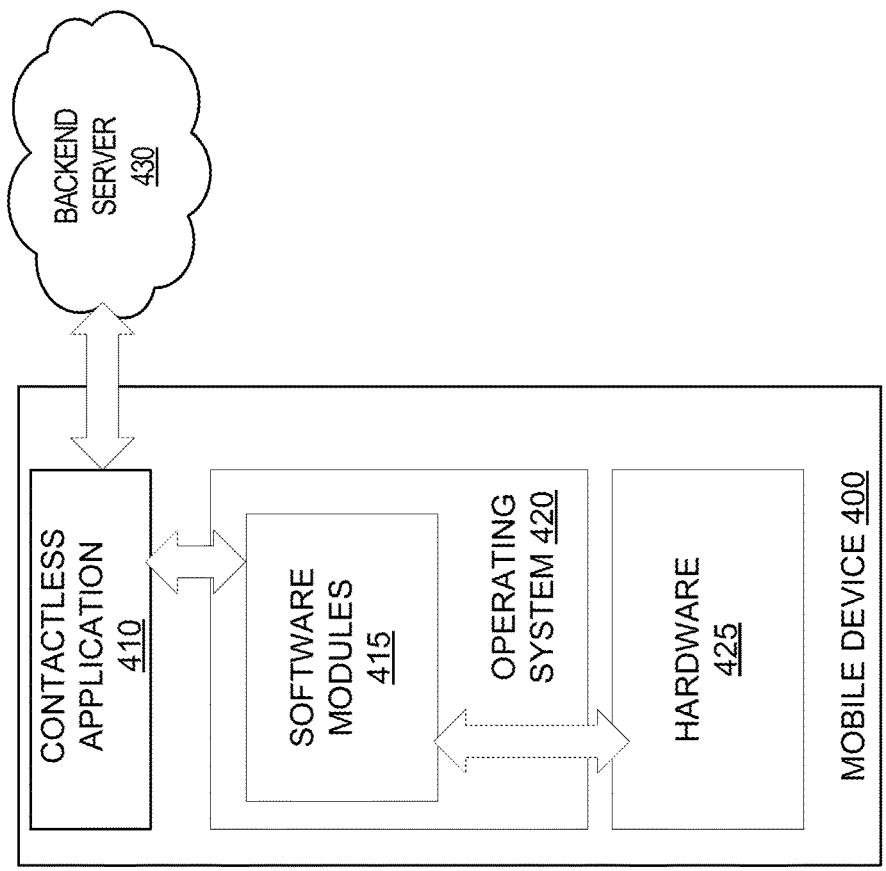
Figure 4A:
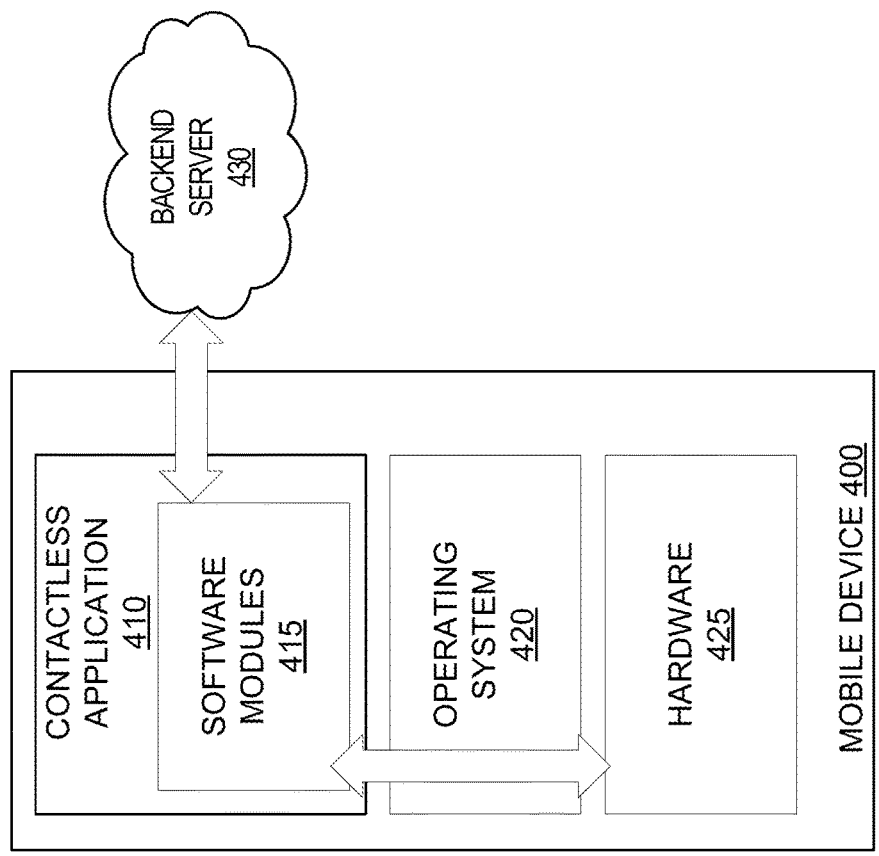

FIGS. 4A-4D illustrate exemplary deployment schemes of the plurality of software modules according to embodiments of the present disclosure. As shown in FIG. 4A, a mobile device 400 comprises an operating system 420, hardware 425, and a contactless application 410. The contactless application 410 may be, for example, a tap-to-pay application. The mobile device 400 may be communicatively coupled to a backend server 430.

In the configuration depicted in FIG. 4A, software modules 415 are embedded and deployed within the contactless application 410. It must be appreciated that the embedding of the software modules 415 within the contactless application 410 may be performed at a binary or source code level. In the configuration depicted in FIG. 4B, the software modules 415 are embedded and deployed in the operating system 420 of the mobile device. The software modules 415 may be executed in a kernel space of the operating system 420 or a separate virtualized OS, and be invoked by the contactless application 410.

In the configuration depicted in FIG. 4C, the software modules 415 are embedded in the hardware 425 of the mobile device 400. The software modules 415 may be invoked by the contactless application 410 via an interface of the operating system 420. Further, the software modules 415 may be executed on a separate secure processor (e.g., a secure element) other than the mobile device's 400 main processor, or the software modules 415 may be executed on a separate logical core of the mobile device's application processor. In the configuration depicted in FIG. 4D, the software modules 415 are deployed in the back end server 430 (e.g., a cloud server) and accessed by an interface 405 of the contactless application 410.

Figure 5:
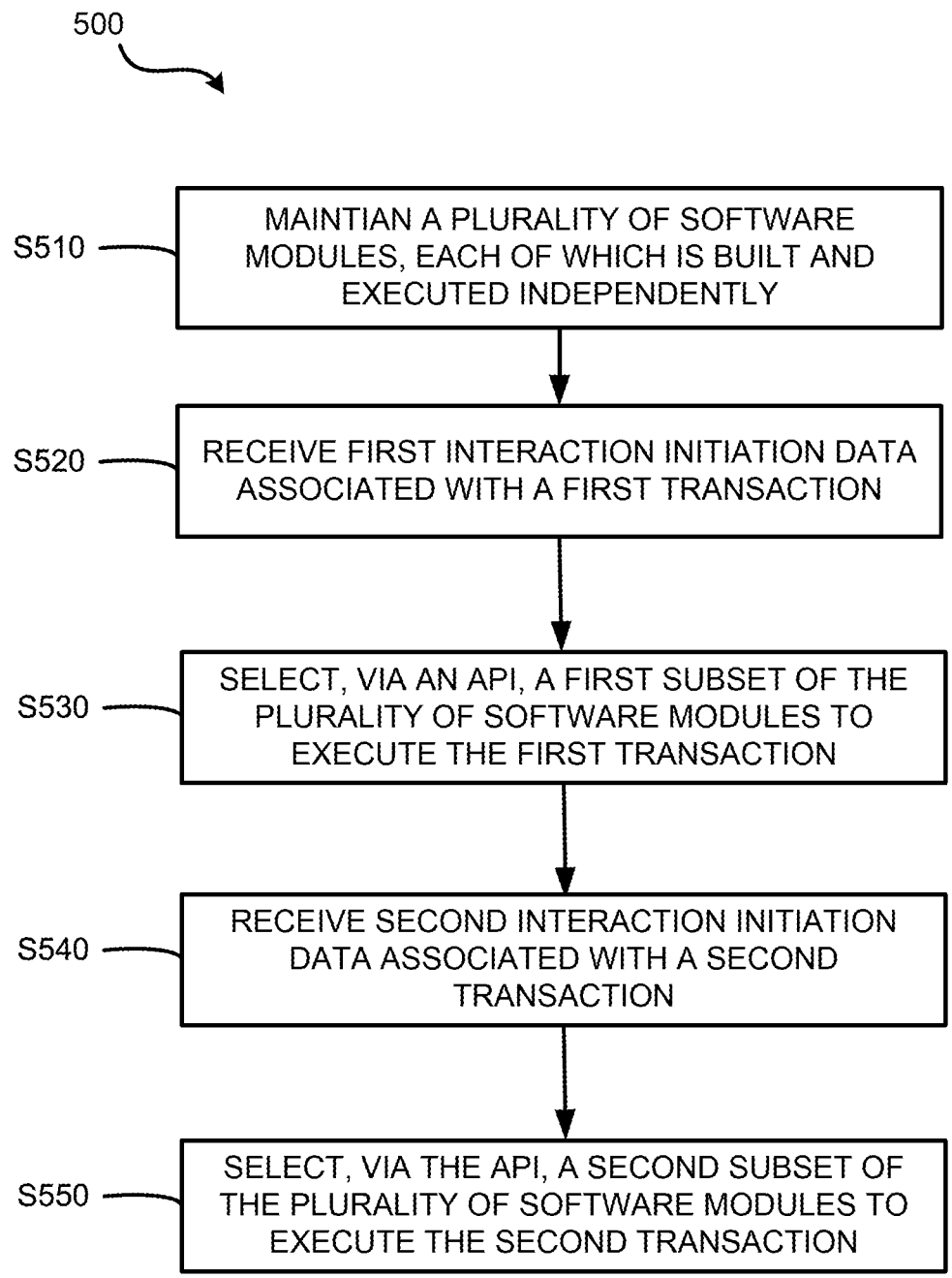
FIG. 5 depicts a flow diagram illustrating a process performed by a mobile device according to an embodiment.

FIG. 5 depicts a flow diagram 500 illustrating a process performed by a mobile device according to an embodiment. Some of the elements in FIG. 3 can also be references in the discussion of FIG. 5. Specifically, the process depicted in FIG. 5 corresponds to a mobile device operating as a point of sale terminal and conducting a contactless transaction. The process commences in step S510, wherein the mobile device maintains a plurality of software modules (along with the application interface as shown in FIG. 3) that are to be utilized in the execution of the contactless transaction. Each of the software modules is built and executed independently of one another. This is illustrated in FIG. 3, wherein the plurality of software modules may include $SM_1$ 301A, $SM_2$ 302A, $SM_3$ 303A and $SM_4$ 304A. For purposes of illustration, $SM_1$ 301A might be an entry point software module, $SM_2$ 302A might be a software module associated with processor A (e.g., a payment processor A), $SM_3$ 303A might be software module associated with processor B (e.g., payment processor B), and $SM_4$ 304A might be an encryption software module that is used by both processor A and B to encrypt data.

In step S520, the mobile device receives a first interaction initiation data associated with a first transaction. For example, when a user performs a tap operation with a user device i.e., by tapping the user device against a reader in the mobile device, interaction initiation data may be transferred from the user device to the mobile device. By some embodiments, the interaction initiation data may correspond to an identifier of the transaction e.g., a type of card used, an identifier associated with an account of the user and the like. By some embodiments, the user device may be associated with an authorizing entity A and a payment processor A.

The process then proceeds to step S530, wherein a first subset of the plurality of software modules maintained in the mobile device are selected via an application interface to execute the first transaction. By some embodiments, a number of software modules included in the first subset of software modules may be determined at least in part on the interaction initiation data received in step S520. It is appreciated that the execution of the first transaction comprises at least, a series of steps including—(a) the application interface selecting a first software module from the first subset of the plurality of software modules, (b) the application interface obtaining a first output from the first software module, and (c) transmitting, via the application interface, the first output to a second software module included in the first subset of the plurality of software modules for executing the first transaction. For example, upon the user tapping the user device against the mobile device, the user device may transmit an identifier of the transaction e.g., a type of card that was tapped. The application interface may select $SM_1$ i.e., the entry point module to commence processing the transaction. The output obtained from the $SM_1$ module may be transmitted to software module $SM_2$ i.e., the software module associated with payment processor A. The output obtained from $SM_2$ may be consequently transmitted to $SM_4$, which encrypts the data output from $SM_2$ for processing the transaction.

In step S540, the mobile device receives second interaction initiation data associated with a second transaction. For example, another user may perform another tap operation using another user device e.g., another payment card of a different type than the user device used in the first transaction. By some embodiments, the user device may be associated with an authorizing entity A and a payment processor B. Upon receiving the second interaction initiation data, the process moves to step S550, wherein a second subset of the plurality of software modules maintained in the mobile device are selected via an application interface to execute the second transaction. For example, upon the user tapping the user device against the mobile device, the user device may transmit an identifier of the transaction e.g., a type of card that was tapped. The application interface may select $SM_1$ i.e., the entry point module to commence processing the transaction. The output obtained from the $SM_1$ module may be transmitted to software module $SM_3$ i.e., the software module associated with payment processor B. The output obtained from $SM_3$ may be consequently transmitted to $SM_4$, which encrypts the data output from $SM_3$ for processing the transaction. In the above description, it must be noted that since the user devices in both the first transaction and the second transaction are associated with the same authorizing entity (i.e., an issuer), but different payment processors (which may utilize different data formats), the data of both transactions may be encrypted via the software module $SM_4$, which may be associated with the authorizing entity i.e., authorizing entity A.

A number of software modules selected for executing the second transaction may be determined based at least in part on the second interaction initiation data. Moreover, it is appreciated that the number of software modules in the second subset may be different than the number of software modules included in the first subset. In other words, the number of software modules used to process the first transaction may be different than the number of software modules used to process the second transaction.

Accordingly, the architecture of software modules as described above with reference to FIG. 3 provides for a unified framework for processing transactions associated with different payment authorizing computers. Compared to the software architecture of FIG. 2B, the architecture of the software modules of FIG. 3 incurs a lower overhead with respect to memory consumption. Additionally, the plurality of software modules of FIG. 3 can be updated in a seamless manner. Specifically, as each software module is built independently of one another i.e., by different software developers, a new software module (from different a different software developer) can be easily added/removed/updated from the pool of software modules without requiring a complete reconfiguration of the other software modules in the system.

Described below is an exemplary payment transaction flow associated with a transaction performed by a user by interacting with a mobile device using a user device. Specifically, a user may use a user device e.g., a credit card or a debit card to pay for goods or services by performing a tap operation of the user device with respect to a mobile device. A contactless application e.g., a tap-to-pay application installed in the mobile device executes and completes the transaction as described below.

As described in embodiments of the present disclosure, a plurality of software modules may process the transaction initiated by the user. To complete a payment associated with the transaction, the mobile device may communicate with an authorizing entity computer (operated by an issuer), via a transport computer (operated by an acquirer) and a processing network such a payment processing network. The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services. The payment processing network may use any suitable wired or wireless network, including the Internet.

In response to the user performing a tap operation i.e., by tapping a user device to a mobile device, interaction initiation data is transferred from the user device to the mobile device. The interaction initiation data received by the mobile device may correspond to an identifier of the transaction, a PAN, a payment token, verification value(s), expiration date, etc. The interaction initiation data is received by the mobile device via a contactless interface. The mobile device utilizes a plurality of software modules to process the transaction. For processing a payment associated with the transaction, the mobile device may then generate an authorization request message that includes the information received from the user device (i.e. interaction initiation data) along with additional transaction information (e.g., a transaction amount, merchant specific information, etc.) and electronically transmits this information to a transport computer. The transport computer may then receive, process, and forward the authorization request message to a processing network for authorization.

In general, prior to the occurrence of a credit or debit-card transaction, the processing network has an established protocol with each issuer on how the issuer's transactions are to be authorized. In some cases, such as when the transaction amount is below a threshold value, the processing network may be configured to authorize the transaction based on information that it has about the user's account without generating and transmitting an authorization request message to the authorizing entity computer. In other cases, such as when the transaction amount is above a threshold value, the processing network may receive the authorization request message, determine the issuer associated with the user device, and forward the authorization request message for the transaction to the authorizing entity computer for verification and authorization. Once the transaction is authorized, the authorizing entity computer may generate an authorization response message (that may include an authorization code indicating the transaction is approved or declined) and transmit this electronic message via its external communication interface to processing network. The processing network may then forward the authorization response message to the transport computer, which in turn may then transmit the electronic message comprising the authorization indication to the mobile device. In turn, the mobile device may transmit this information to the user device.

By some embodiment, if the access data is in the form of a token, then the processing network may exchange the token for a real credential (e.g., a PAN). Any authorization request message may then be modified to include the real credential and it may be forward to the authorizing entity computer for verification. The authorizing entity computer can generate an authorization response message with an approval or decline. The authorization response message can be transmitted to the processing network, and the processing network may replace the credential with the token. The processing network may then transmit the authorization response message back to the mobile device. At the end of the day or at some other suitable time interval, a clearing and settlement process between the resource computer, the transport computer, the processing network, and the authorizing entity computer may be performed on the transaction.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method conducted using a mobile device, the method comprising:
maintaining a plurality of software modules, each software module of the plurality of software modules being built and executed on a distinct software package, the plurality of software modules being executed independently of one another;
receiving first interaction initiation data corresponding to a first transaction;
in response to receiving the first interaction initiation data, selecting via an application interface, a first subset of the plurality of software modules to execute the first transaction, wherein executing the first transaction comprises:
selecting, by the application interface, a first software module from the first subset of the plurality of software modules;
obtaining by the application interface, a first output from the first software module; and
transmitting, via the application interface, the first output to a second software module included in the first subset of the plurality of software modules;
receiving second interaction initiation data corresponding to a second transaction; and
in response to receiving the second interaction initiation data, selecting via the application interface, a second subset of the plurality of software modules to execute the second transaction, wherein the first subset of the plurality of software modules is different than the second subset of the plurality of software modules.

2. The method of claim 1, wherein a first software module is executed on a first software package and a second software module is executed on a second software package, the first software package being different from the second software package.

3. The method of claim 1, wherein the first interaction initiation data is a first identifier associated with the first transaction and the second interaction initiation data is a second identifier associated with the second transaction, a first number of software modules included in the first subset being determined based at least in part on the first identifier, and a second number of software modules included in the second subset being determined based at least in part on the second identifier.

4. The method of claim 1, wherein the plurality of software modules are embedded in an application installed on the mobile device.

5. The method of claim 4, wherein the mobile device is a mobile phone.

6. The method of claim 1, wherein the plurality of software modules are embedded in an operating system of the mobile device, and invoked by an application installed on the mobile device.

7. The method of claim 1, wherein the plurality of software modules are embedded in hardware of the mobile device, and invoked by an application installed on the mobile device via an operating system of the mobile device.

8. The method of claim 1, wherein the plurality of software modules are deployed on a backend server, and accessed via an access interface associated with an application installed on the mobile device.

9. A mobile device comprising:
a processor; and
a non-transitory computer readable medium coupled to the processor, the non-transitory computer readable medium comprising code, executable by the processor, for implementing a method comprising:
maintaining a plurality of software modules embedded in an application installed on the mobile device, each software module of the plurality of software modules being built and executed on a distinct software package, the plurality of software modules being executed independently of one another;

receiving a first trigger signal from a first user device, the first trigger signal being indicative of a first transaction to be performed by the mobile device;

responsive to receiving the first trigger signal, selecting via an application interface, a first subset of the plurality of software modules to execute the first transaction, wherein executing the first transaction comprises:

selecting, by the application interface, a first software module from the first subset of the plurality of software modules;

obtaining by the application interface, a first output from the first software module; and transmitting, via the application interface, the first output to a second software module included in the first subset of the plurality of software modules:

receiving a second trigger signal from a second user device, the second trigger signal being indicative of a second transaction to be performed by the mobile device; and responsive to receiving the second trigger signal, selecting via the application interface, a second subset of the plurality of software modules to execute the second transaction.

10. The mobile device of claim 9, wherein a first software module is executed on a first software package and a second software module is executed on a second software package, the first software package corresponding to a first executable file and the second software package corresponding to a second executable file, the first executable file being different from the second executable file.

11. The mobile device of claim 9, wherein the first trigger signal is received from the first user device in response to the first user device being detected within a predetermined distance with respect to the mobile device.

12. The mobile device of claim 9, wherein the first user device is different than the second user device.

13. The mobile device of claim 12, wherein the first user device is associated with a first processing computer, and the second user device is associated with a second processing computer, the first processing computer being different from the second processing computer.

14. The mobile device of claim 13, wherein each of the first user device and the second user device is a card.

15. The mobile device of claim 9, wherein the application installed on the mobile device is a contactless application.

16. The mobile device of claim 9, wherein a first number of software modules included in the first subset is determined based at least in part on the first user device, and a second number of software modules included in the second subset is determined based at least in part on the second user device, the first number of software modules being different than the second number of software modules.

17. The mobile device of claim 9, wherein the non-transitory computer readable medium comprising code, executable by the processor, for implementing the method further comprising:

updating the plurality of software modules embedded in the application by adding a new software module to the plurality of software modules without reconfiguring other software modules included in the plurality of software modules.

\* \* \* \* \*